(12) United States Patent
Royle et al.

(10) Patent No.: US 6,453,743 B1
(45) Date of Patent: Sep. 24, 2002

(54) COMPENSATED INTEGRATED MICRO-MACHINED YAW RATE SENSOR

(75) Inventors: Chris Royle, Cheshire; Colin H. J. Fox, Nottingham; Robert Victor Wright, London; Paul Kirby, Northhampton, all of (GB); Peter Enoksson; Goran Stemme, both of Stockholm (SE); Chris Merveille, Tonsberg (NO)

(73) Assignee: Melexis, Tessenderlo (BE)

( * ) Notice: Subject to any disclaimer, the term of this patent is extended or adjusted under 35 U.S.C. 154(b) by 0 days.

(21) Appl. No.: 09/523,319

(22) Filed: Mar. 10, 2000

(51) Int. Cl.[7] .................................................. G01P 9/00
(52) U.S. Cl. .................................................. 73/504.12
(58) Field of Search .............................. 73/1.77, 504.02, 73/504.03, 504.04, 504.12

(56) References Cited

U.S. PATENT DOCUMENTS

| 5,203,208 A | 4/1993 | Bernstein |
| 5,610,334 A | 3/1997 | Fima et al. |
| 5,895,851 A * | 4/1999 | Kano et al. ............... 73/504.04 |
| 5,952,572 A * | 9/1999 | Yamashita et al. ....... 73/504.04 |
| 5,992,233 A | 11/1999 | Clark |
| 6,164,134 A * | 12/2000 | Cargille ................... 73/504.02 |
| 6,230,563 B1 * | 5/2001 | Clark et al. .............. 73/504.04 |

* cited by examiner

Primary Examiner—Richard A. Moller
(74) Attorney, Agent, or Firm—Townsend and Townsend and Crew LLP

(57) ABSTRACT

An integrated circuit combines micro-machined elements, piezoelectric elements and signal processing components as part of a compensated oscillating gyroscopic sensor for angular motion detection. An oscillating mass is supported on a number of flexible beams micro-machined into an integrated circuit device, such as a silicon CMOS device. Several Piezo-electric elements are also coupled to the beams to excite the mass and to measure the accelerations. Integrated in the device are electronic circuitry that initiates and maintains the oscillation and electronic circuitry that detects and measures the subsequent motion. Additional circuitry is also provided to determine the Coriolis acceleration and thus the magnitude of the external perturbing velocity.

16 Claims, 2 Drawing Sheets

COMPENSATED INTEGRATED MICRO-MACHINED YAW RATE SENSOR

CROSS REFERENCES TO RELATED APPLICATIONS

This application is related to U.S. Non-Provisional Patent Application Serial No. 09/522,667, filed concurrently herewith on Mar. 10, 2000, entitled "COMPENSATED INTEGRATED MICRO-MACHINED YAW RATE SENSOR WITH QUADRATURE SWITCHING," the disclosure of which is hereby incorporated by reference in its entirety.

BACKGROUND OF THE INVENTION

The present invention relates generally to motion sensing devices, and more particularly to micro-machined gyro sensors for measuring an applied angular velocity.

The advent of micro-machining has opened the way for a re-assessment of older traditional solutions to problems and has created opportunities to create improved implementations of established principles with integrated interface and control electronics in a highly developed system. One example is the implementation of a gyro in an integrated circuit.

Gyros have been effectively used in aircraft and other navigational systems with great effect as motion sensors, but at high cost. Implementing a gyro in integrated form can lead to a cost reduction which makes their use more feasible in the automotive field for such uses as navigation, stability control, suspension control and general vehicle dynamics management.

Generally, a gyro is a mass that is excited to rotate or oscillate or vibrate in a stable manner. The inertia of the mass resists attempts to disturb the motion. Moving the mass so as to change the relative position of the plane in which it is moving causes a reaction, known as the Coriolis effect, that leads to an acceleration at right angles to the plane of the motion. This acceleration is the result of, and proportional to, the perturbing motion. By measuring the acceleration in the orthogonal direction(s), a value for the perturbing velocity can be determined.

The problems associated with gyros are well understood and at the traditional macro level have been addressed and overcome. These solutions however do not have direct equivalents in the micro-machined environment where the cost-benefits of integrated manufacture come from silicon processing techniques developed for high volume processing of integrated circuits. These processing techniques are not suitable for implementing the individual machining requirements or mechanical adjustments needed for micro-machined gyros. The minute mechanical adjustments that are made on parts, which in the macro situation are quite large, would be proportionally small on the micro level and consequently more difficult and costly to implement.

In addition to the basic mechanical problems of producing a balanced mass that can be set up to oscillate or spin to act as a gyro in a micro-machined environment, techniques are needed to supply energy to the mass to excite the motion, and to measure the orthogonal acceleration(s) caused by the perturbing velocity. A major problem also exists where the mass exhibits a tendency to oscillate off-axis, known as quadrature deflection, or to oscillate in more than one mode. A well-known problem exists, for example, where an oscillating mass, in addition to the basic linear motion, oscillates in a twisting or rotational manner. Such unwanted oscillations occur when the mass is not perfectly balanced or aligned. These unwanted oscillations act as if they were externally applied velocities which cause additional Coriolis accelerations that must be detected and separated from the wanted accelerations.

SUMMARY OF THE INVENTION

According to the invention, a gyro sensor includes an oscillating mass supported on a number of flexible beams micro-machined into an integrated circuit device, such as a silicon CMOS device. Integrated in the device are electronic circuitry that initiates and maintains the oscillation and electronic circuitry that detects and measures the subsequent motion. For example, in one embodiment, Piezo-electric elements are deposited onto the beams to excite the mass and to measure the accelerations. In this embodiment, deposition of the piezo electric elements onto the beams using silicon processing techniques generally provides better adherence of the piezo material to the beams than more conventional adhesive techniques. Additional circuitry is also provided to determine the Coriolis acceleration, and thus the magnitude of the external perturbing velocity.

According to an aspect of the invention, a micro-machined gyro sensor capable of measuring an externally imposed velocity is provided which typically comprises a mass coupled to a rigid annular support by a first pair of opposing flexible members and a second pair. of opposing flexible members, wherein the first pair of members define a first axis, and wherein the second pair of members define a second axis substantially orthogonal to the first axis. The gyro sensor also typically includes a pair of driving elements coupled to the first pair of members, a first sensing element coupled to one of the first pair of members, wherein the first sensing element generates a first signal proportional to the oscillation of the mass along the first axis, and a second sensing element integrated into one of the second pair of members, wherein the second sensing element generates a second signal proportional to the oscillation of the mass along the second axis. The gyro sensor also typically includes a control circuit coupled to the driving elements, wherein the control circuit generates a control signal which when applied to the driving elements causes the mass to oscillate along the first axis, and a detection circuit coupled to the first and second sensing elements, wherein the detection circuit compares the first and second signals and generates an output signal proportional to the imposed velocity.

According to another aspect of the invention, a micro-machined gyro sensor capable of measuring an externally imposed velocity is provided which typically comprises a mass coupled to a rigid annular support by a first pair of opposing flexible members and a second pair of opposing flexible members, wherein the first pair of members define a first axis, and wherein the second pair of members define a second axis substantially orthogonal to the first axis. The gyro sensor also typically includes driving means coupled to the first pair of members for causing the mass to oscillate along the first axis, and detection means, coupled to one of the first pair of members and one of the second pair of members, for detecting and comparing oscillations of the mass along the first axis and along the second axis so as to measure the Coriolis acceleration caused by the imposed velocity.

According to yet another aspect of the invention, a method is provided for measuring an angular velocity imposed on a micro-machined gyro sensor which includes a mass coupled to a rigid annular support by a first pair of opposing flexible members and a second pair of opposing flexible members, wherein the first pair of members define a first axis, and wherein the second pair of members define a second axis substantially orthogonal to the first axis. The method typically comprises the steps of causing the mass to oscillate along the first axis; generating a first signal proportional to the oscillation of the mass along the first axis; generating a second signal proportional to the oscillation of the mass along the second axis, wherein oscillation along the second axis results from the velocity being imposed on the gyro sensor; and comparing the first and second signals so as to determine the Coriolis acceleration caused by the imposed velocity.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
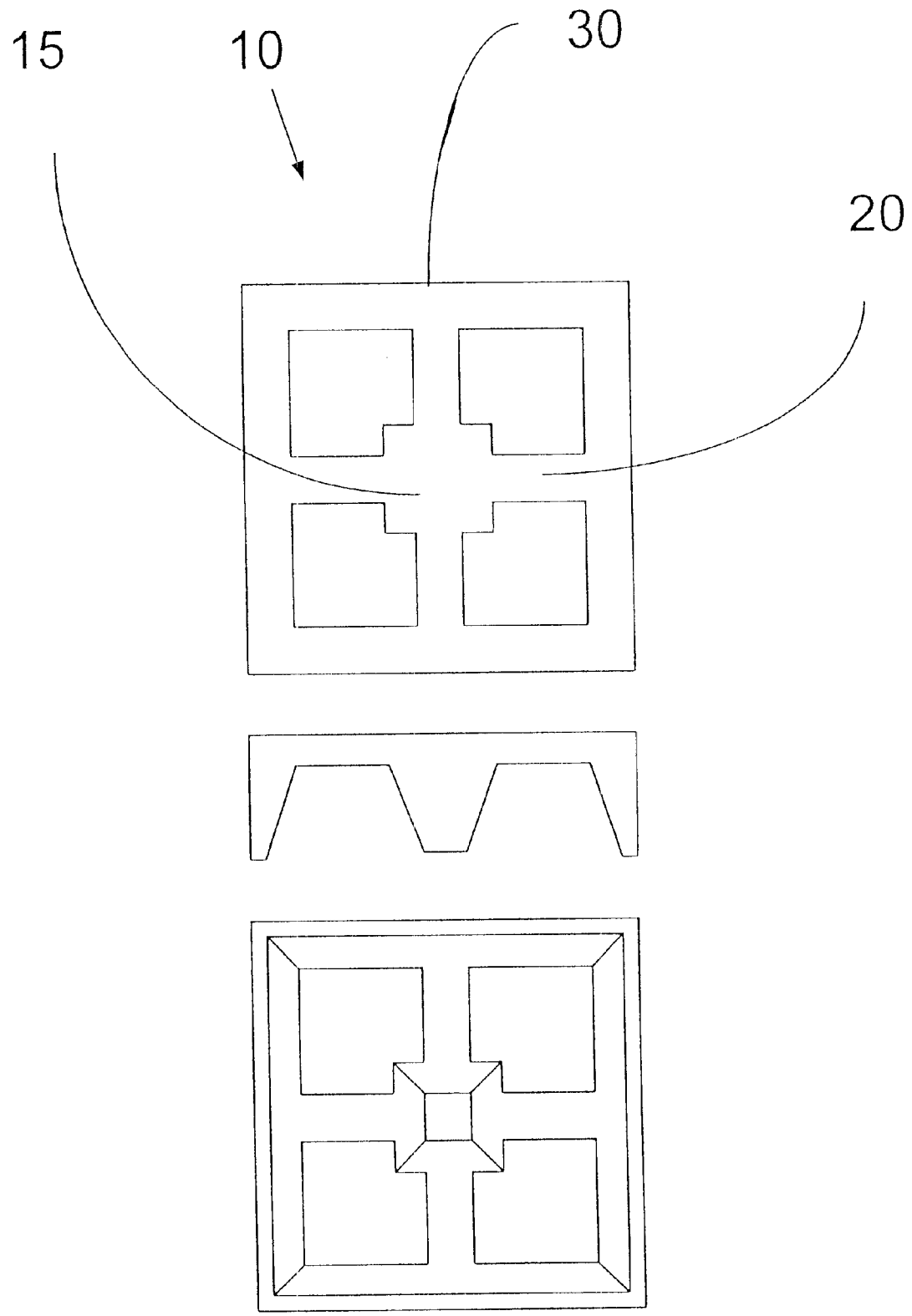
FIG. 1 shows the general arrangement of micro-machined elements according to the present invention.

FIG. 1 shows the general arrangement of the micro-machined elements in a central mass device 10 according to the present invention. Central mass device 10 includes a central core 15 connected to an annulus-like rigid support structure 30 ("annulus 30") by a plurality of flexible beams 20. Central core 15 and beams 20 are of sufficient dimension, and are arranged such that when the device is subjected to the anticipated perturbing forces and accelerations, the deflections of the mass of central core 15 does not exceed the flexibility of beams 20. Annulus 30 is mounted such that core 15 and beams 20 are free to move in the plane of annulus 30. As shown, annulus 30 is rectangular in shape, however, it may take on any geometry as desired, for example, circular. The desired design dimensions depend upon the materials chosen for the components of central mass device 10 as well as the details of the manufacturing process. The arrangement must be capable of oscillating in the chosen manner while at the same time surviving undamaged any shock or vibration condition to which the device may ultimately be exposed.

According to one embodiment, deposited onto beams 20 are a plurality of Piezo electric elements. If a Piezo electric element is connected across a voltage source and a voltage is applied thereto, the element exerts a mechanical force which changes the dimension of the Piezo electric element in a direction that is dependent upon the axis of the applied voltage. The force is generally proportional to the magnitude of the applied voltage. In a similar manner, if the Piezo electric element is strained by mechanical movement of the Piezo electric element, a voltage is generated across the Piezo electric element in a direction dependent upon the direction of the applied strain. Generally, the generated voltage is proportional to the applied strain.

Figure 2:
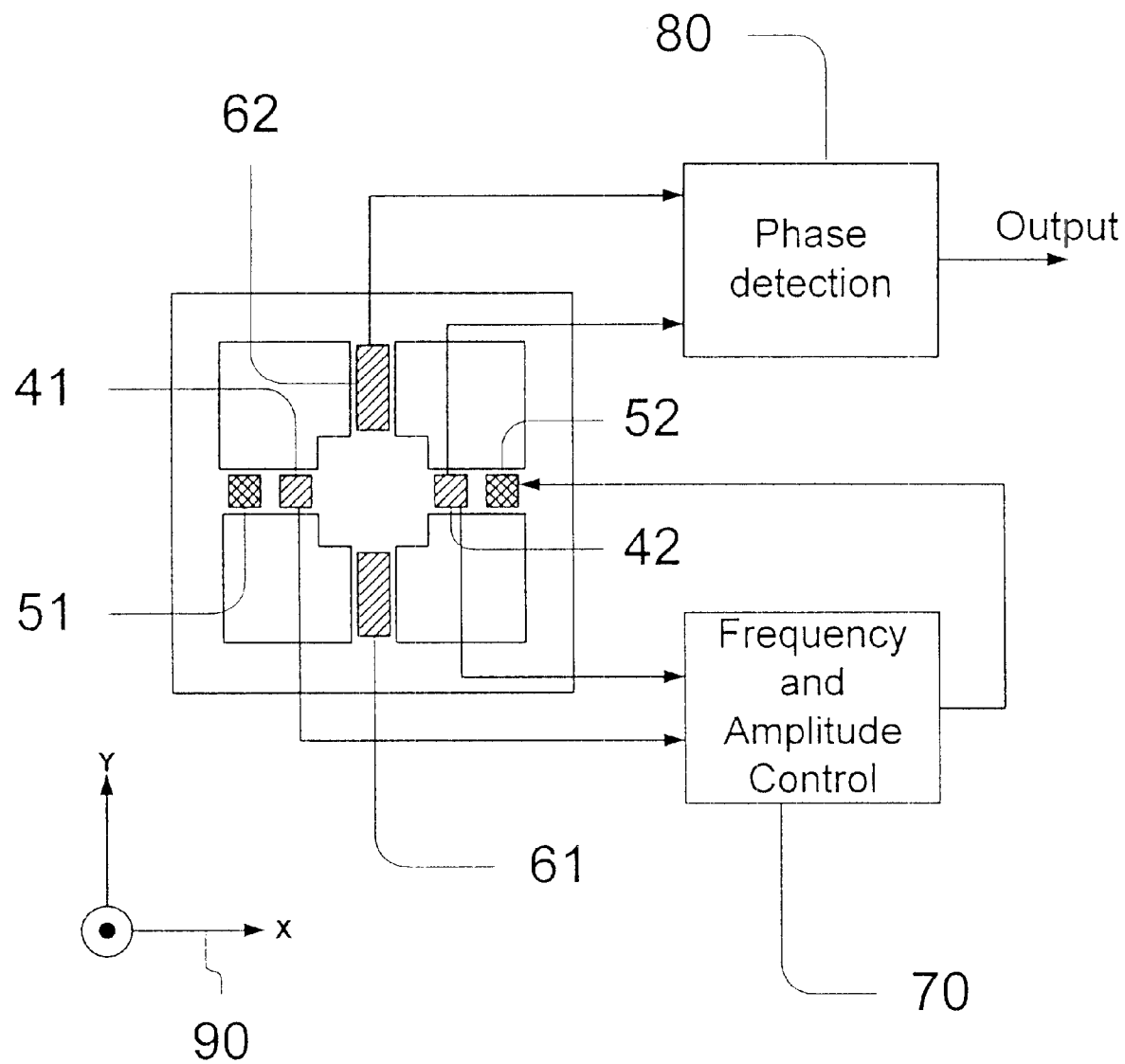
FIG. 2 shows the arrangement of Piezo electric elements and their connections implemented in the device of FIG. 1 according to the present invention.

A preferred arrangement of Piezo electric elements in the device of FIG. 1 is shown in FIG. 2. Rectangular central core 15 is supported on four beams 20 arranged orthogonally, one on each side of the core. Two separate pairs of Piezo electric elements, first sensing pair 41 and 42 and second driving pair 51 and 52, are coupled to each of a first pair of opposite beams. A third pair of Piezo electric elements, sensing elements 61 and 62, is coupled to a second pair of opposite beams as shown.

Frequency and amplitude control circuitry 70 is provided to generate an alternating voltage signal. Control circuitry 70 is connected to the second Piezo electric element pair 51 and 52 on each beam of the first pair of opposite beams. The connections are such that the signal generated by control circuitry 70 when applied to the Piezo electric element 51 in one beam causes element 51 to increase its length measured along the direction of the beam from annulus 30 to core 15, and the signal when applied to the second Piezo electric element 52 in the opposite beam causes element 52 to decrease its length in the same relative direction. In this manner, the alternating voltage signal applied by control circuitry 70 causes the Piezo electric elements 51 and 52 to drive the first pair of opposing beams so as to set up a mechanical oscillation of core 15 (mass). The mechanical oscillation is along the axis defined as the X-axis 90, determined by the first pair of opposing beams. The mechanical oscillation has a frequency dependent upon the frequency of the applied alternating voltage.

One or both of the first pair of Piezo electric elements 41 and 42 on the first pair of opposite beams is connected to control circuitry 70. The voltage generated by the first pair of Piezo electric elements 41 and 42 in response to the mechanical deformation caused by the second pair of Piezo electric elements 51 and 52 are used by control circuitry 70 to detect the amplitude and timing of the mechanical movement of the core along the X-axis. Control circuitry 70 is also capable of altering the voltage signal applied to the second pair of Piezo electric elements 51 and 52 in response to a signal from one or both of the first pair of Piezo electric elements 41 and 42 to maintain the oscillations without distortion (i.e., at a desired frequency and/or amplitude).

The third pair of Piezo electric elements 61 and 62 on the second pair of opposite beams is connected to detection circuitry 80 (only element 62 is shown with a connection to detection circuitry 80). The first pair of Piezo electric elements 41 and 42 on the first pair of opposite beams are also connected to detection circuitry 80 (only element 42 is shown with a connection to detection circuitry 80). The voltage signals generated by the third pair of Piezo electric elements 61 and 62 include signal components from the Coriolis acceleration caused by rotation of the gyro in the plane of the silicon element plus signal components from any unwanted modes of oscillation in the beam and core arrangements. Detection circuitry 80 compares the signals received from the third pair of Piezo electric elements 61 and 62 with the signals from the first pair of Piezo electric elements 41 and 42.

It will be appreciated that the manufacturing process typically results in 25 minute variations in the mechanical parameters of the core and the beam arrangement. These variations will likely lead to an imbalance in the arrangement which may cause the mechanical oscillations to be along an axis not perfectly aligned with the intended axis (i.e., x-axis 90). Such off-axis oscillations (e.g., having a y-component) result in a mechanical strain in the second pair of opposite beams. In such a case, a signal is generated by one or both of the third pair of Piezo electric elements 61 and 62 integrated therein. The undesired signal differs in phase and amplitude from the desired signal generated in response to the Coriolis acceleration and is present even when the gyro is stationary. The desired signal is extracted by detection circuitry 80 by comparison of the phases of the signals received from the third pair of Piezo electric elements 61 and 62 and the first pair of Piezo electric elements 41 and 42 and by determining the component of the resulting signal whose phase changes with time. In one embodiment, the undesired signal is eliminated by subtracting the undesired component determined by detection circuitry 80.

By integrating the micro-machined mechanical elements onto the same integrated circuit device, such as a CMOS silicon integrated circuit, as the frequency and amplitude control circuitry and the detection circuitry necessary for controlling the oscillations and measuring and extracting the signals, a significant reduction in cost can be achieved. By further eliminating the errors caused by off-axis oscillations without the need for mechanical adjustments carried out individually on each gyro, the cost and yield is again significantly improved. Also, in one embodiment, by depositing the piezo electric elements onto the flexible elements (beams) supporting the oscillating mass using silicon processing techniques, compatibility with normal silicon processing techniques is ensured and the bonding between the sensing and driving elements and the flexible elements will typically be better than when using films and adhesives.

It will be appreciated that if the driving signals applied to piezo elements 51 and 52 are in phase, the oscillation of the core may not be in the plane of annulus 30, but instead, the mass may oscillate in a direction orthogonal to the plane of annulus 30 (e.g., having a z-axis component). The resultant voltages derived from Piezo elements 41, 42, 61 and 62 may vary in phase from those described for the case where the oscillation is in the plane of annulus 30.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although two driving elements are shown and two sensing elements in each beam are shown, only one driving element can be used and only one sensing element in each beam can be used. Additionally, the processing of the signals can be implemented using well-known analog or digital techniques, such as by using an analog-to-digital converter with an output coupled to a microprocessor and/or a non-volatile digital memory device. Therefore, the scope of the appended claims should be accorded the broadest interpretation so as to encompass all such modifications and similar arrangements.

What is claimed is:

1. A micro-machined gyro sensor capable of measuring an externally imposed velocity comprising:
   a mass coupled to a rigid annular support by a first pair of opposing flexible members and a second pair of opposing flexible members, wherein the first pair of members define a first axis, and wherein the second pair of members define a second axis substantially orthogonal to the first axis;
   a pair of piezo electric driving elements deposited on the first pair of members;
   a first piezo electric sensing element deposited on one of the first pair of members, wherein the first sensing element generates a first signal proportional to the oscillation of the mass along the first axis;
   a second piezo electric sensing element deposited on one of the second pair of members, wherein the second sensing element generates a second signal proportional to the oscillation of the mass along the second axis;
   a control circuit coupled to the driving elements, wherein the control circuit generates a control signal which when applied to the driving elements causes the mass to oscillate along the first axis; and
   a detection circuit coupled to the first and second sensing elements, wherein the detection circuit compares the first and second signals and generates an output signal proportional to the imposed velocity.

2. The gyro sensor of claim 1, wherein the detection circuit compares the phases of the first and second signals so as to determine the Coriolis acceleration caused by the imposed velocity.

3. The gyro sensor of claim 1, wherein the detection circuit is capable of determining an undesired signal component resulting from off-axis oscillations of the mass along the second axis when no external velocity is imposed by comparing the phases of the first and second signals.

4. The gyro sensor of claim 3, wherein the detection circuit compensates for the undesired oscillations by subtracting out the undesired component from the output signal.

5. The gyro sensor of claim 1, wherein all of said piezo electric elements are deposited on the respective members using silicon processing techniques.

6. The gyro sensor of claim 1, wherein the control circuit is coupled to the first sensing element, and wherein the control circuit alters the control signal in response to the first signal received from the first sensing element so as to maintain oscillation of the mass along the first axis at a desired amplitude and frequency.

7. The gyro sensor of claim 1, further comprising a third sensing element deposited on a second one of the first pair of members, wherein the third sensing element generates a third signal proportional to the oscillation of the mass along the first axis, wherein the control circuit is coupled to the third sensing element, and wherein the control circuit alters the control signal in response to the third signal received from the third sensing element so as to maintain oscillation of the mass along the first axis at a desired amplitude and frequency.

8. The gyro sensor of claim 1, wherein the detection circuit is coupled to an analog-to-digital converter which converts the output signal to a digital signal.

9. The gyro sensor of claim 8, wherein an output of the converter is coupled to one of a microprocessor for processing the digital signal and a non-volatile memory for storing the digital signal.

10. The gyro sensor of claim 1, wherein the gyro sensor is micro-machined into a silicon substrate.

11. A micro-machined gyro sensor capable of measuring an externally imposed velocity comprising:
    a mass coupled to a rigid annular support by a first pair of opposing flexible members and a second pair of opposing flexible members, wherein the first pair of members define a first axis, and wherein the second pair of members define a second axis substantially orthogonal to the first axis;
    driving means coupled to the first pair of members for causing the mass to oscillate along the first axis, wherein the driving means includes a pair of driving elements deposited on the first pair of members; and
    control means, coupled to the driving elements, for generating a control signal which when applied to the driving elements causes the mass to oscillate along the first axis;
    detection means, coupled to one of the first pair of members and one of the second pair of members, for detecting and comparing oscillations of the mass along the first axis and along the second axis so as to measure the Coriolis acceleration caused by the imposed velocity, wherein the detection means includes a means for generating a first signal proportional to the oscillations of the mass along the first axis; and wherein the control means includes means for altering the control signal in response to the first signal so as to maintain oscillation of the mass along the first axis at a desired amplitude and frequency.

12. The gyro sensor of claim 11, wherein each of the pair of driving elements includes a piezo electric element deposited onto the respective members.

13. The gyro sensor of claim 12, wherein each of the piezo electric elements are deposited using silicon processing techniques.

14. The gyro sensor of claim 11, wherein the gyro sensor is micro-machined into a silicon substrate.

15. A micro-machined gyro sensor capable of measuring an externally imposed velocity, comprising:

a mass coupled to a rigid annular support by a first pair of opposing flexible members and a second pair of opposing flexible members, wherein the first pair of members define a first axis, and wherein the second pair of members define a second axis substantially orthogonal to the first axis;

a pair of piezo electric driving elements deposited on the first pair of members;

a first pair of piezo electric sensing elements deposited on the first pair of members, wherein the first pair of sensing elements generates first signals proportional to the oscillation of the mass along the first axis;

a second pair of piezo electric sensing elements deposited on the second pair of members, wherein the second pair of sensing elements generates second signals proportional to the oscillation of the mass along the second axis;

a control circuit coupled to the driving elements, wherein the control circuit generates a control signal which when applied to the driving elements causes the mass to oscillate along the first axis; and a detection circuit coupled to the first and second pairs of sensing elements, wherein the detection circuit processes the first and second signals so as to generate an output signal proportional to the imposed velocity.

16. A micro-machined gyro sensor capable of measuring an externally imposed velocity comprising:

a mass coupled to a rigid annular support by a first pair of opposing flexible members and a second pair of opposing flexible members, wherein the first pair of members define a first axis, and wherein the second pair of members define a second axis substantially orthogonal to the first axis;

driving means coupled to the first pair of members for causing the mass to oscillate along the first axis, wherein the driving means includes a pair of driving elements deposited on the first pair of members; and control means, coupled to the driving elements, for generating a control signal which when applied to the driving elements causes the mass to oscillate along the first axis;

detection means, coupled to the first pair of members and the second pair of members, for detecting oscillations of the mass along the first axis and along the second axis so as to measure the Coriolis acceleration caused by the imposed velocity, wherein the detection means includes a means for generating a first signal proportional to the oscillations of the mass along the first axis; and wherein the control means includes means for altering the control signal in response to the first signal so as to maintain oscillation of the mass along the first axis at a desired amplitude and frequency.

* * * * *